July 11, 1967
C. L. WELLONS
3,330,259
FUEL CELL
Filed Sept. 27, 1965
3 Sheets-Sheet 1
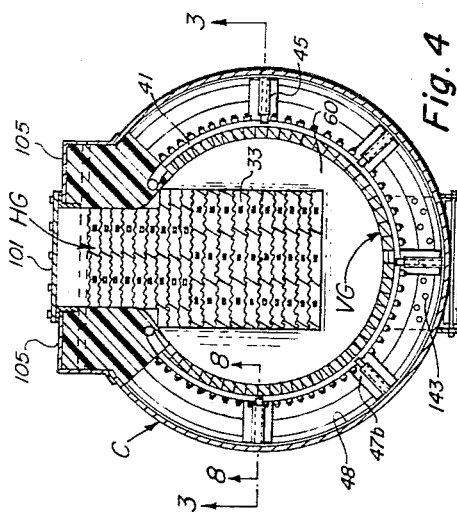
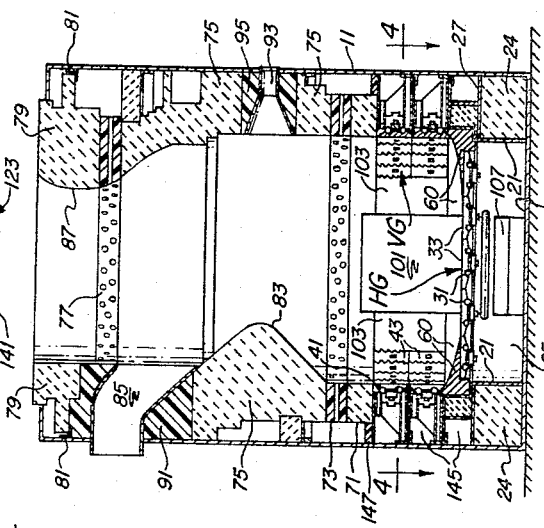
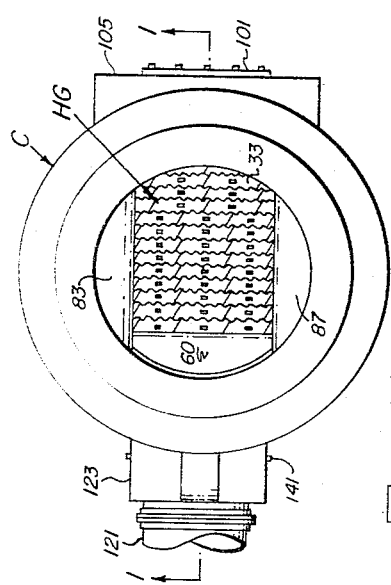
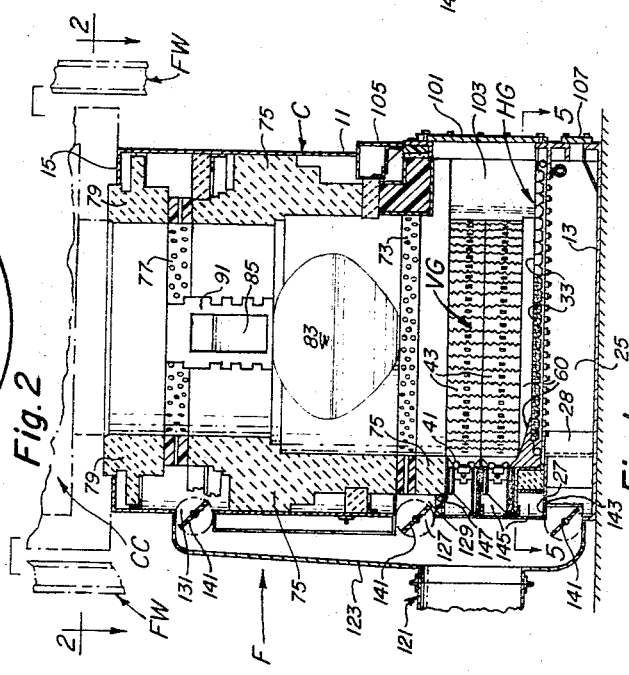
CHARLES L. WELLONS
INVENTOR
BY
BUCKHORN, BLORE, KLARQUIST & SPARKMAN
ATTORNEYS

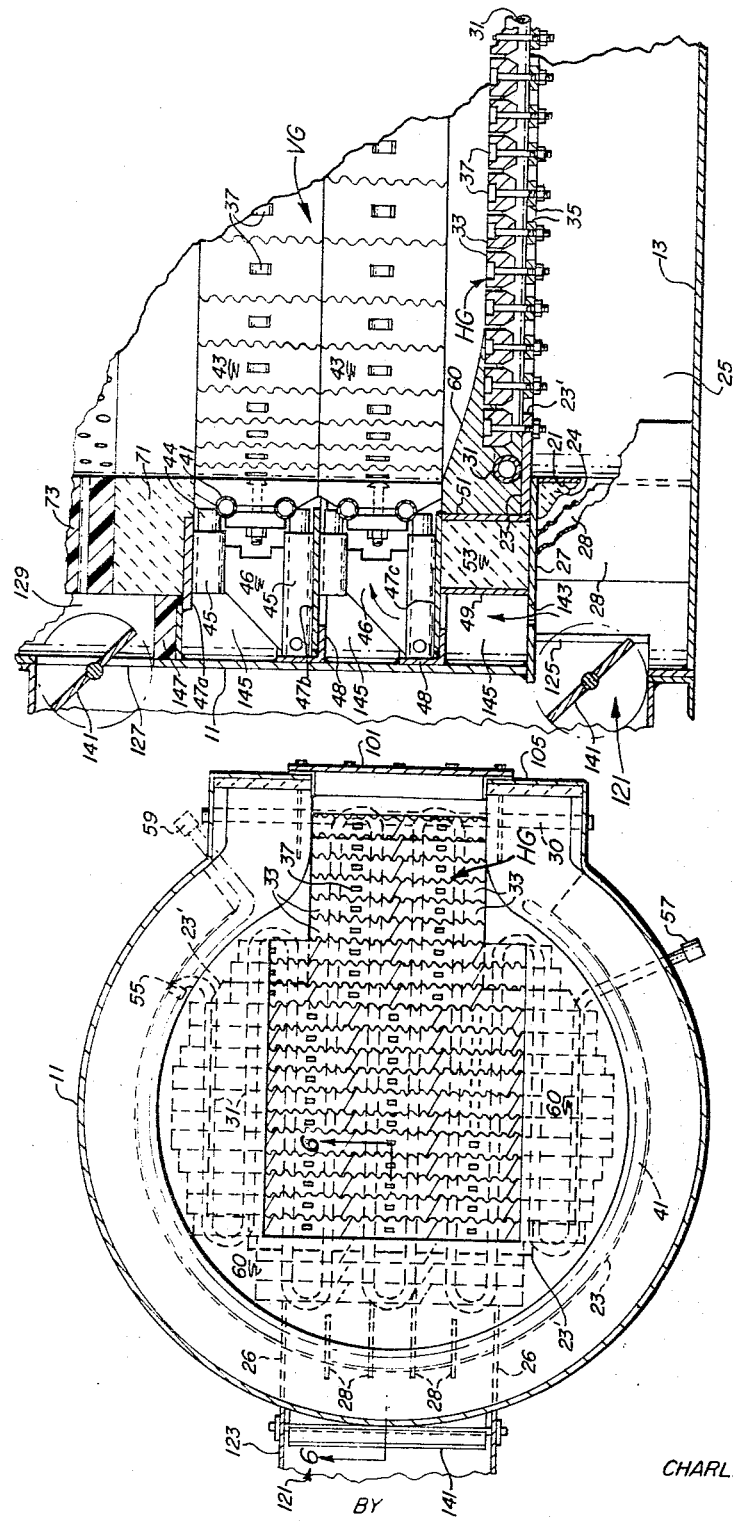

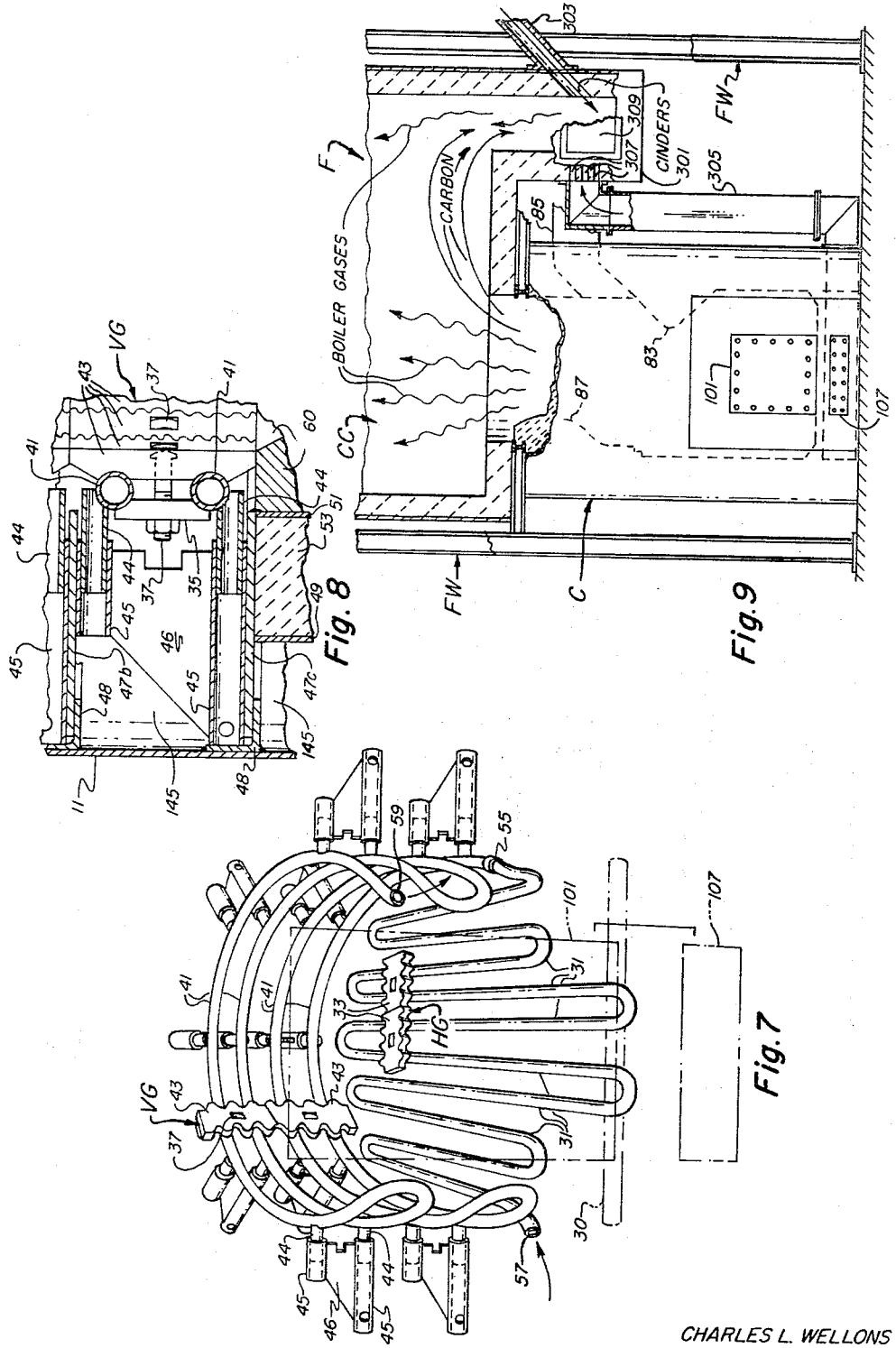

United States Patent Office 3,330,259
Patented July 11, 1967

3,330,259
FUEL CELL
Charles L. Wellons, 4400 SW. Sunset Drive,
Lake Oswego, Oreg. 97034
Filed Sept. 27, 1965, Ser. No. 490,562
10 Claims. (Cl. 122—2)

This invention relates to improvements in the cell portion of a furnace and particularly to improvements in the cells of a multi-cell waste fuel furnace. Cells of this general type are shown in U.S. patents to Dennis, 2,602,409 and 2,754,778.

In prior fuel cells of the type under consideration of which I am aware, difficulty has been experienced in keeping down the temperature of the hearth portion of the cell to a value below that at which ready formation of clinkers occurs, with the result that there has been an excess of clinker formation in such prior cells which interferes with the operation and maintenance of such cells in a known manner.

It is a main object of the present invention to provide a cell overcoming the above disadvantages, and particularly to provide a fuel cell having a hearth composed of water cooled grates around which rises a water cooled upright section, so that air can be directed through such hearth and upright grate section to effect an adequate supply of air to the hearth zone while maintaining the temperature of such zone below the above mentioned objectionable value.

I have also discovered that substantial mixing of the incoming air with the products of combustion can be effected by forming the cell walls above the grate section with vertically staggered but generally opposed inwardly projecting portions whereby to cause the rising gases and air to be laterally deflected and hence mixed.

Further, I have found that I can utilize radially perforated plastic rings as tuyere blocks which have the advantage of more uniform supply of air to the cell.

Various other objects of the invention will be apparent from the following description taken in connection with the accompanying drawings, wherein:

FIG. 1 is a vertical midsection through a fuel cell of my invention, taken along line 1—1 of FIG. 2;

FIG. 2 is a plan view of the fuel cell shown in FIG. 1;

FIG. 3 is a vertical midsection taken along line 3—3 of FIG. 4;

FIG. 4 is a horizontal section of the cell taken along line 4—4 of FIG. 3;

FIG. 5 is a horizontal sectional view of the cell on an enlarged scale, taken along line 5—5 of FIG. 1;

FIG. 6 is an enlarged fragmentary section of the fuel cell taken along line 6—6 of FIG. 5;

FIG. 7 is a perspective view of the water cooling pipe for the grate sections of the cell;

FIG. 8 is an enlarged fragmentary view of the cell taken along line 8—8 of FIG. 4; and FIG. 9 is a side elevational view of a novel drop box construction that may advantageously be employed with my cell.

Referring to FIG. 1, the cell C is shown as part of an overall furnace F, the combustion chamber CC of which is located above plural cells, the cell C being one of such cells. The remainder of the furnace is supported by the main furnace framework FW.

Cell C includes a generally cylindrical case 11 having at its bottom a floor 13 (FIG. 1) and at its top an annular lip 15.

A hearth support member is disposed concentrically within the lower end of the case 11 and includes a cylindrical upright portion 21 (FIG. 6) and a plate 23 which is keyhole shaped exteriorly (FIG. 5) to conform to the cross sectional shape of the furnace at the location of the plate, and has a rectangular opening 23' formed therein.

Castable refractory material 24 (FIG. 3) is poured into the annular space between the upright portion 21 and the case 11 and fills the same except at an air passage 25 (compare FIGS. 1 and 3) where there are a pair of spaced plates 26 between the hearth support member 23 and the case floor 13 to define sides of the air passage. An annular cover plate member 27 (FIG. 6) provides a radial extension of the support plate 23 and defines the upper wall of the air passage. The air passage also has a number of parallel plates 28 (FIG. 5) to provide for support and to direct the incoming air properly.

A horizontal hearth grate HG (FIG. 1) is supported by the plate 23 and by a support pipe 30 shown in FIGS. 1 and 4, and the grate includes a sinuous water pipe section 31 (FIG. 5) on which are mounted rows of grate bars 33 which may be, and preferably are, of the type shown in U.S. patent to Sams, 3,027,881. Thus, the bars 33 are secured in place by clips 35 (FIG. 6) and bolts 37, and reference may be had to such patent for the further details of the bars, clips and bolts. The water pipe section 31 is secured to the plate portion 23 by the bolts 37 of the end grates (FIG. 6), the plate 23 having suitable holes to accomodate the bolts.

A vertical grate VG of C form (FIG. 4) is disposed above but adjacent to the hearth grate HG and includes a water pipe section 41 of sinuous form to which are secured (in the manner above explained) two vertical rows of grate bars 43. The pipe section 41 is supported by pairs of slide tubes 44 (FIG. 6) which are telescopically received by guide tubes 45 which are connected together by radially arranged plates 46 to provide guide tube units. These units are disposed below an annular plate 47a and rest on two series of radial plates 47b and 47c (the latter two plates being secured to and supported by annular shelf brackets 48 on the case 11). The telescopic relationship of the tubes 44 and 45 permits radial expansion and contraction of the pipe section 41 during operation of the furnace.

A pair of concentric rings 49 and 51 connect plate 47c to plate 27, and castable refractory material 53 fills the space between the rings 49 and 51.

The water pipe sections 31 and 41 are joined at 55 (FIG. 7) and provided a continuous water pipe having an inlet at 57 (FIGS. 5 and 7) and an outlet 59.

Malleable "chrome ore" 60 (a refractory material) is pounded into the spaces between the lower row of grate bars 43 and the support plate 23 to cover the outermost grate bars 31 as shown in FIGS. 1, 3 and 6.

Above the vertical grate VG, firebrick (or other suitable refractory material) is built up to provide a lower layer 71 (FIG. 1) located beneath and supporting a lower tuyere ring 73, an intermediate section 75 disposed between ring 73 and an upper tuyere ring 77, and an upper layer 79 supported by the upper tuyere ring and by an annular shelf bracket 81 provided on the case 11. The firebrick layers and tuyere rings form a generally cylindrical passage except that the left-hand wall in FIG. 3 has a lower bulge 83 located beneath a fuel chute 85, and except that the right-hand wall has an upper bulge 87 located generally opposite the bulge 83 but disposed at a level somewhat above that of the bulge 83. It is pointed out that the bulge 87 commences at a level below that of the upper edge of the bulge 83, and both bulges are generally in the form of segments of cylinders as is evident from a comparison of FIGS. 1 and 2.

The refractory parts of the cell which are in direct communication with the burning fuel can be made of various refractory materials, as an example, material 71 could be a super air set plastic. Material 24 could be a castable silica base refractory. The chrome ore 60 has high slag resistance. The tuyere rings may be formed of castable high alumina base refractory material.

The fuel chute 85 is surrounded and supported by a castable refractory material 91 (FIGS. 1 and 3) such as, for instance, a high temperature alumina base refractory. The cell is provided with a viewing slot or window 93 (FIG. 3) which is surrounded by castable material 95. The cell has an upper clean out door 101 (FIGS. 1 and 4) located at a level just above that of the horizontal grate HG, the door closing a clean out passage defined by castable refractory material 103. The latter is disposed behind a facing structure 105 which forms part of the case 11. A lower clean out door 107 is provided on the case 11 below the level of the horizontal grate HG and closes a clean out passageway 109.

Air under pressure is supplied to the cell through a common main duct 121 (FIG. 1) which is connected to the lower end of a manifold member 123. The manifold member has a lower outlet 125 in communication with the air passage 25; has an intermediate outlet 127 connected to the case and in communication with an annular space 129 provided between the case 11 and the intermediate refractory section 75; and has an upper outlet 131 connected to the case 11 and communicating with an annular space provided between the upper refractory layer 79 and the intermediate refractory section 75.

Each manifold outlet is equipped with a damper valve 141 so as to provide for independent control over the supply of air to the grate zone, the lower tuyere ring and the upper tuyere ring. As shown in FIG. 6, suitable holes 143 are provided in the plate 27 so that part of the air supplied through outlet 125 is delivered through the holes into the annular space 145 which extends upwardly to a barrier ring 147 of refractory material which is disposed between the lower refractory layer 71 and the case 11.

In operation, waste fuel (or other fuel if desired) is delivered to the grate HG through the chute 85 and burns in a pile on the grate, sufficient air being supplied through the interstices of the grates to support and augment combustion. This air passing through the vertical and orizontal grates, together with the water cooling thereof, maintains the temperature in the grate zone at a value below that at which clinker formation is excessive thus preserving the life of the cell and facilitating longer operating periods of the cell without the necessity of clean out. As the gases rise in the cell, they are deflected one way by the bulge 83 and the opposite way by the bulge 87 to cause a mixing of the gases with the air supplied by the tuyere rings 73 and 79 and also with the air initially supplied through the grates.

FIG. 9 shows a further step in avoiding the damage caused by cinders and slag. I provide a drop box 301 in the furnace F into which cinders which are carried upwardly by the rising gases can drop and burn at a lower temperature than in the hearth zone. I also deposit the cinders which are collected from the exhaust gases into the drop box 301 through a chute 303 rather than returning them to the hearth zone through the fuel chute 85, thus to avoid damage to the refractory in the hearth zone and also enable the cinders to burn at a lower temperature.

I supply air to the drop box by means of a duct 305 which communicates with the space beneath the hearth grate HG and thus receives air from the manifold outlet 125. This air is delivered to the drop box 301 through passages 307 in the drop box. A clean out door 309 is provided for the drop box.

Having described the invention in what is considered to be the preferred embodiment thereof, it is desired that it be understood that the invention is not to be limited other than by the provisions of the following claims.

I claim:

1. A furnace cell of upright form having
means defining an upright generally cylindrical heat resistant refractory wall and a chamber beneath said wall,
a water cooled grate structure of generally cup shape disposed in said chamber and having a horizontal portion and a vertical portion and having air passages through said portions,
said refractory wall defining an upward continuation of the vertical portion of said grate structure,
said refractory wall having a fuel chute formed therein located to direct fuel onto said grate structure, and
means for conducting air to said chamber at the exterior of said grate structure whereby air is supplied to the lower portion of said cell through said grate structure,
said refractory wall having a first inward bulge from one side only of said refractory wall and at a place just below said chute and a second inward bulge opposite said chute from one side only of said refractory wall whereby upwardly flowing gases are deflected first one way and then the opposite way to cause turbulence and mixture thereof.

2. A furnace cell of upright form having
means defining an upright generally cylindrical heat resistant refractory wall and a chamber beneath said wall,
a water cooled grate structure of generally cup shape disposed in said chamber and having a horizontal portion and a vertical portion and having air passages through said portions,
said refractory wall defining an upward continuation of the vertical portion of said grate structure,
said refractory wall having a fuel chute formed therein located to direct fuel onto said grate structure,
means for conducting air to said chamber at the exterior of said grate structure whereby air is supplied to the lower portion of said cell through said grate structure,
said refractory wall including upper and lower plastic rings which have radial holes,
and means for directing air to the exterior of said rings to supply air therethrough to the interior of said cell at places above said chamber,
one ring being below said fuel chute and the other being above said chute.

3. A furnace cell of upright form having
means defining an upright generally cylindrical heat resistant refractory wall and a chamber beneath said wall,
a water cooled grate structure of generally cup shape disposed in said chamber and having a horizontal portion and a vertical portion and having air passages through said portions,
said refractory wall defining an upward continuation of the vertical portion of said grate structure,
said refractory wall having a fuel chute formed therein located to direct fuel onto said grate structure,
means for conducting air to said chamber at the exterior of said grate structure whereby air is supplied to the lower portion of said cell through said grate structure,
said refractory wall defining an upward continuation rings which have radial holes,
means for directing air to the exterior of said rings to supply air therethrough to the interior of said cell at places above said chamber,
common supply means for supplying air to said conducting means and said directing means,
and means for independently controlling the flow of air to said grate structure and rings.

4. A furnace cell of upright form having
means defining an upright generally cylindrical heat resistant refractory wall and a chamber beneath said wall,
a water cooled grate structure of generally cup shape disposed in said chamber and having a horizontal portion and a vertical portion and having air passages through said portions, said refractory wall defining an upward continuation of the vertical portion of said grate structure, said refractory wall having a fuel chute formed therein located to direct fuel onto said grate structure, means for conducting air to said chamber at the exterior of said grate structure whereby air is supplied to the lower portion of said cell through said grate structure, and means providing for radial expansion and contraction of said vertical grate portion relative to said refractory wall.

5. A furnace cell of upright form having means defining an upright generally cylindrical heat resistant refractory wall and a chamber beneath said wall, a water cooled grate structure of generally cup shape disposed in said chamber and having a horizontal portion and a vertical portion and having air passages through said portions, said refractory wall defining an upward continuation of the vertical portion of said grate structure, said refractory wall having a fuel chute formed therein located to direct fuel onto said grate structure, means for conducting air to said chamber at the exterior of said grate structure whereby air is supplied to the lower portion of said cell through said grate structure, and means providing for expansion and contraction of said vertical grate portion, the last named means being of telescopic form.

6. A furnace cell of upright form having means defining an upright generally cylindrical heat resistant refractory wall and a chamber beneath said wall, a water cooled grate structure of generally cup shape disposed in said chamber and having a horizontal portion and a vertical portion and having air passages through said portions, said refractory wall defining an upward continuation of the vertical portion of said grate structure, said refractory wall having a fuel chute formed therein located to direct fuel onto said grate structure, means for conducting air to said chamber at the exterior of said grate structure whereby air is supplied to the lower portion of said cell through said grate structure, and means providing for expansion and contraction of said vertical grate portion, the last named means being of telescopic form, said first named means including a metal case, said telescopic means being carried by said case.

7. A furnace cell of upright form having means defining an upright generally cylindrical essentially solid heat resistant refractory wall and a chamber beneath said wall, a water cooled grate structure of generally cup shape disposed in said chamber and having a horizontal portion and a vertical portion and having air passages through said portions, said refractory wall defining an upward continuation of the vertical portion of said grate structure, said refractory wall having a fuel chute formed therein located to direct fuel onto said grate structure, means for conducting air to said chamber at the exterior of said grate structure whereby air is supplied to the lower portion of said cell through said grate structure, first water pipe means in said horizontal grate portion, second water pipe means in said vertical grate portion, said first and second water pipe means being connected to form a single water course, means for conducting water to said single water course, said refractory wall having a first inward bulge below said chute and a second inward bulge opposite said chute whereby upwardly flowing gases are deflected to cause turbulence and mixture thereof, said refractory wall including upper and lower plastic rings which have radial holes, and means for directing air to the exterior of said rings to supply air therethrough to the interior of said cell at places above said chamber, one ring being below said fuel chute and the other being above said chute, and common supply means for supplying air to said conducting means and said directing means.

8. A furnace cell of upright form having means defining an upright generally cylindrical essentially solid heat resistant refractory wall and a chamber beneath said wall, a water cooled grate structure of generally cup shape disposed in said chamber and having a horizontal portion and a vertical portion and having air passages through said portions, said refractory wall defining an upward continuation of the vertical portion of said grate structure, said refractory wall having a fuel chute formed therein located to direct fuel onto said grate structure, means for conducting air to said chamber at the exterior of said grate structure whereby air is supplied to the lower portion of said cell through said grate structure, first water pipe means in said horizontal grate portion, second water pipe means in said vertical grate portion, said first and second water pipe means being connected to form a single water course, means for conducting water to said single water course, said refractory wall having a first inward bulge below said chute and a second inward bulge opposite said chute whereby upwardly flowing gases are deflected to cause turbulence and mixture thereof, said refractory wall including upper and lower plastic rings which have radial holes, and means for directing air to the exterior of said rings to supply air therethrough to the interior of said cell at places above said chamber, one ring being below said fuel chute and the other being above said chute, common supply means for supplying air to said conducting means and said directing means, and means for independently controlling the flow of air to said grate structure and rings.

9. A furnace cell of upright form having means defining an upright generally cylindrical essentially solid heat resistant refractory wall and a chamber beneath said wall, a water cooled grate structure of generally cup shape disposed in said chamber and having a horizontal portion and a vertical portion and having air passages through said portions, said refractory wall defining an upward continuation of the vertical portion of said grate structure, said refractory wall having a fuel chute formed therein located to direct fuel onto said grate structure, means for conducting air to said chamber at the exterior of said grate structure whereby air is supplied to the lower portion of said cell through said grate structure, first water pipe means in said horizontal grate portion, second water pipe means in said vertical grate portion, said first and second water pipe means being connected to form a single water course, means for conducting water to said single water course, said refractory wall having a first inward bulge below said chute and a second inward bulge opposite said chute whereby upwardly flowing gases are deflected to cause turbulence and mixture thereof, said refractory wall including upper and lower plastic rings which have radial holes, and means for directing air to the exterior of said rings to supply air therethrough to the interior of said cell at places above said chamber, one ring being below said fuel chute and the other being above said chute, common supply means for supplying air to said conducting means and said directing means, means for independently controlling the flow of air to said grate structure and rings, and means providing for expansion and contraction of said vertical grate portion, the last named means being of telescopic form, said first named means including a metal case, said telescopic means being carried by said case.

10. A furnace cell of upright form having an upright metal case having a floor from which rises a vertical wall, water cooled grate means near the floor of said case and including a horizontal bed portion and a vertical grate portion wherein each portion includes water carrying pipes and grate members on said pipes, the grate members and pipes of the horizontal bed portion being spaced above the floor of the case to provide an air chamber beneath said horizontal bed portion, the grate members and pipes of the vertical grate portion being spaced inwardly from the vertical wall of said metal case to provide an air chamber around said vertical grate portion, refractory material within said case and extending upwardly from the vertical grate portion and forming a continuation thereof, said grate members providing spaces therebetween through which air may pass, and means for conducting air to said air chambers to supply air to products burning on said hearth portion.

References Cited

UNITED STATES PATENTS

| | | | |
|---|---|---|---|
| 1,651,636 | 12/1927 | Shaughnessy | 122—2 |
| 1,973,697 | 9/1934 | Bailey | 110—10 |
| 1,973,705 | 9/1934 | Hardgrove et al. | 122—2 |
| 2,276,659 | 3/1942 | Kreisinger | 122—371 |
| 2,694,371 | 11/1954 | Sampson | 110—7 |
| 2,875,735 | 3/1959 | Falla | 122—2 |
| 3,225,721 | 12/1965 | Rowley | 110—7 |

KENNETH W. SPRAGUE, *Primary Examiner.*